US009325956B2

(12) United States Patent
Grundhofer

(10) Patent No.: US 9,325,956 B2
(45) Date of Patent: Apr. 26, 2016

(54) NON-LINEAR PHOTOMETRIC PROJECTOR COMPENSATION

(71) Applicant: Disney Enterprises, Inc., Burbank, CA (US)

(72) Inventor: Anselm Grundhofer, Greifensee (CH)

(73) Assignee: DISNEY ENTERPRISES, INC., Burbank, CA (US)

(*) Notice: Subject to any disclaimer, the term of this patent is extended or adjusted under 35 U.S.C. 154(b) by 111 days.

(21) Appl. No.: 14/180,083

(22) Filed: Feb. 13, 2014

(65) Prior Publication Data

US 2014/0320827 A1  Oct. 30, 2014

Related U.S. Application Data

(60) Provisional application No. 61/817,816, filed on Apr. 30, 2013.

(51) Int. Cl.
*G03B 21/14* (2006.01)
*H04N 9/31* (2006.01)

(52) U.S. Cl.
CPC ........... *H04N 9/3194* (2013.01); *H04N 9/3182* (2013.01); *H04N 9/3185* (2013.01)

(58) Field of Classification Search
CPC .. H04N 9/3182; H04N 9/3185; H04N 9/3194
USPC .......... 353/30, 31, 69–70, 121; 348/114, 189, 348/211.99, 734, 743–747
See application file for complete search history.

(56) References Cited

U.S. PATENT DOCUMENTS

| 8,102,584 | B2* | 1/2012 | Bolle et al. ..................... 359/238 |
| 2002/0024640 | A1* | 2/2002 | Ioka ................................ 353/94 |
| 2003/0025837 | A1 | 2/2003 | Krogstad et al. |
| 2004/0036813 | A1 | 2/2004 | Matsuda |
| 2004/0140981 | A1 | 7/2004 | Clark |
| 2004/0140982 | A1* | 7/2004 | Pate .............................. 345/600 |
| 2007/0171380 | A1 | 7/2007 | Wright et al. |
| 2008/0084543 | A1 | 4/2008 | Gilbert et al. |
| 2009/0115915 | A1 | 5/2009 | Steinberg et al. |
| 2009/0174638 | A1* | 7/2009 | Brown et al. .................... 345/88 |
| 2009/0290128 | A1 | 11/2009 | George |
| 2011/0175925 | A1* | 7/2011 | Kane ........................ G01J 1/42 345/589 |
| 2013/0222386 | A1* | 8/2013 | Tannhauser ........... G06T 3/4038 345/428 |

OTHER PUBLICATIONS

Aliaga, Daniel G. et al., "Fast High-Resolution Appearance Editing Using Superimposed Projections", ACM Trans. Graph., 31, 2, 13:1-13:13, Apr. 2012.

(Continued)

*Primary Examiner* — Sultan Chowdhury
(74) *Attorney, Agent, or Firm* — Dorsey & Whitney LLP

(57) ABSTRACT

The present disclosure is related to a method for calibrating a projector. The method includes receiving by a processing element one or more mapping images. After receiving the images, the method includes defining by the processing element a non-linear color mapping function, the color mapping function mapping pixels between the projector and a camera used to capture the mapping images. The method then includes determining by the processing element a compensation image using the color mapping function. The compensation image corresponds to an input image and takes into account variations in the surface onto which the input image is to be projected.

17 Claims, 10 Drawing Sheets

(56) References Cited

OTHER PUBLICATIONS

Bimber, Oliver et al., "Embedded Entertainment with Smart Projectors", Computer, IEEE Computer Society, Jan. 2005, 48-55.
Bimber, Oliver, "The Visual Computing of Projector-Camera Systems", STAR-State of the Art Report, Eurographics 2007.
Chen, Xinli et al., "Color Mixing Property of a Projector-Camera System", School of Software, Aug. 10, 2008, 1-6.
Dold, A. et al., "Lecture Notes in Mathematics", Constructive Theory of Functions of Several Variables, Proceedings of a Concerence, Held at Oberwolfach, Apr. 25-May 1, 1976.
Fujii, Kensaku et al., "A Projector-Camera System with Real-Time Photometric Adaptation for Dynamic Environments", Proceedings of the 2005 IEEE Computer Societ Concernce on Computer Vision and Pattern REcognition, 2005.
Grundhofer, Anselm et al., "Real-Time Adaptive Radiometric Compensation", IEEE Transactions on Visualization and Computer Graphics, vol. 14, No. 1, Jan./Feb. 2008, 97-108.
Guehring, Jens, "Reliable 3D Surface Acquisition, Registration and Validation using Statistical Error Models", Third International Conference on 3-D Digital Imaging and Modeling May 28- Jun. 1, 2001 Quebec City, Canada.
Hardy, R. L., "Theory and Applications of the Multiquadric-Biharmonic Method", Computers Math. Applic. vol. 19, No. 8/9, 1990, 163-208.
Majumber, Aditi et al., "Color Nonuniformity in Projection-Based Displays: Analysis and Solutions", IEE Transactions on Visualization and Computer Graphics, vol. XX, No. Y,, 2003, 100-111.
Park, Sun Jee et al., "Adaptive Chrominance Correction for a Projector Considering Image and Screen Color", ISVC 2007, Part II, LNCS 4842, 2007, 751-759.
Powell, M.J.D., "The BOBYQA algorithm for bound constrained optimization without derivatives", DAMTP 2009/NA 06, Department of Applied MAthematics and Theoretical Physics, Aug. 2009, 1-39.
Sharma, G. et al., "The ciede2000 color-difference formula: Implementation notes, supplementary test data and mathematical observations", Color Research and Application, 30, 1, 2005, 21-30.
Shepard, Donald, "A two-dimensional interpolation function for irregularly-spaced data", Proceedings—1968 ACM National Conference, 1968, 517-524.

\* cited by examiner

NON-LINEAR PHOTOMETRIC PROJECTOR COMPENSATION

CROSS REFERENCE TO RELATED APPLICATIONS

This application claims the benefit of priority pursuant to 35 U.S.C. §119(e) of U.S. Provisional application No. 61/817,816 filed on Apr. 30, 2013 entitled "Practical Non-Linear Photometric Projector Compensation," which is hereby incorporated herein by reference in its entirety.

FIELD

The present invention relates generally to adjusting projected images from a projector, and more specifically to compensating projected images to neutralize effects of a surface onto which the images are projected.

BACKGROUND

Photometric projector compensation is used in various fields such as entertainment, cultural heritage, and augmented reality. The purpose of photometric projector compensation is to adjust one or more projected images from a projector in order to account for variations in the characteristics from one projector to another, variations in projection surfaces (e.g., color, material, and/or texture), and the like. By compensating one or more images to account for variations the images reflected or transmitted from the projection surface may better correspond to a desired image.

Conventional techniques for projector compensation generally involve a radiometrically calibrated projector. Radiometric calibration for a projector is often a laborious and time consuming process. For example, a typical radiometric calibration requires a specific measurement device such as a spectoradiometer, a photometer or a radiometrically calibrated camera, and a calibration software to generate a mapping into a well-defined color space, for example having a linear response function, sRGB, or one described by a specific gamma curve. Most of these calibration software tools only allow to calibrate individual color channels, such as red, green and blue, but do not consider the potentially complex internal color mixing during calibration. These conventional calibration techniques typically require recalibration if there are any changes to the systems, such as any hardware changes, changing projectors, or the like. Further, recently high end projectors include advanced color processing software and hardware and are difficult to analyze as the processing within the projector is often a "black-box" and the details are not known to the user, making it more difficult to model the projector behavior in terms of unknown color-processing and color-mixing in order to compensate the images accurately. These conventional techniques, in addition to being time consuming and difficult to execute, also may lose image contrast and color artifacts may occur due to intensity saturation of the projector on dark surface pigments. In other words, these techniques do not typically work well when the projection surface has dark colors.

It is with these shortcomings in mind that the present invention has been developed.

SUMMARY

One embodiment of the present disclosure may take the form of a method for calibrating a projector. The method includes receiving by a processing element one or more mapping images. After receiving the images, the method includes defining by the processing element a non-linear color mapping function, the color mapping function mapping pixels between the projector and a camera used to capture the mapping images. The method then includes determining by the processing element a compensation image using the color mapping function. The compensation image corresponds to an input image and takes into account variations in the surface onto which the input image is to be projected.

Another embodiment of the disclosure may take the form a system for projector calibration. The system includes a camera, a projector to project images onto a projection surface, and a computer in communication with the camera and the projector. The computer includes a processor configured to determine a compensation image to modulate the projection surface and provide the compensation image to the projector. In the system, the compensation image is determined using a non-linear mapping between the camera and the projector.

Yet another embodiment of the disclosure may take the form of a method for determining neutralizing colors for an image projected onto a surface. The method includes capturing by a camera at least one structured light pattern projected by a projector onto the surface, mapping a plurality of projector pixels to a plurality of camera pixels in a non-linear manner, and using the map to determine a neutralization image; wherein the neutralization image neutralizes the surface to substantially replicate an input image.

SPECIFICATION

Overview

Figure 1:
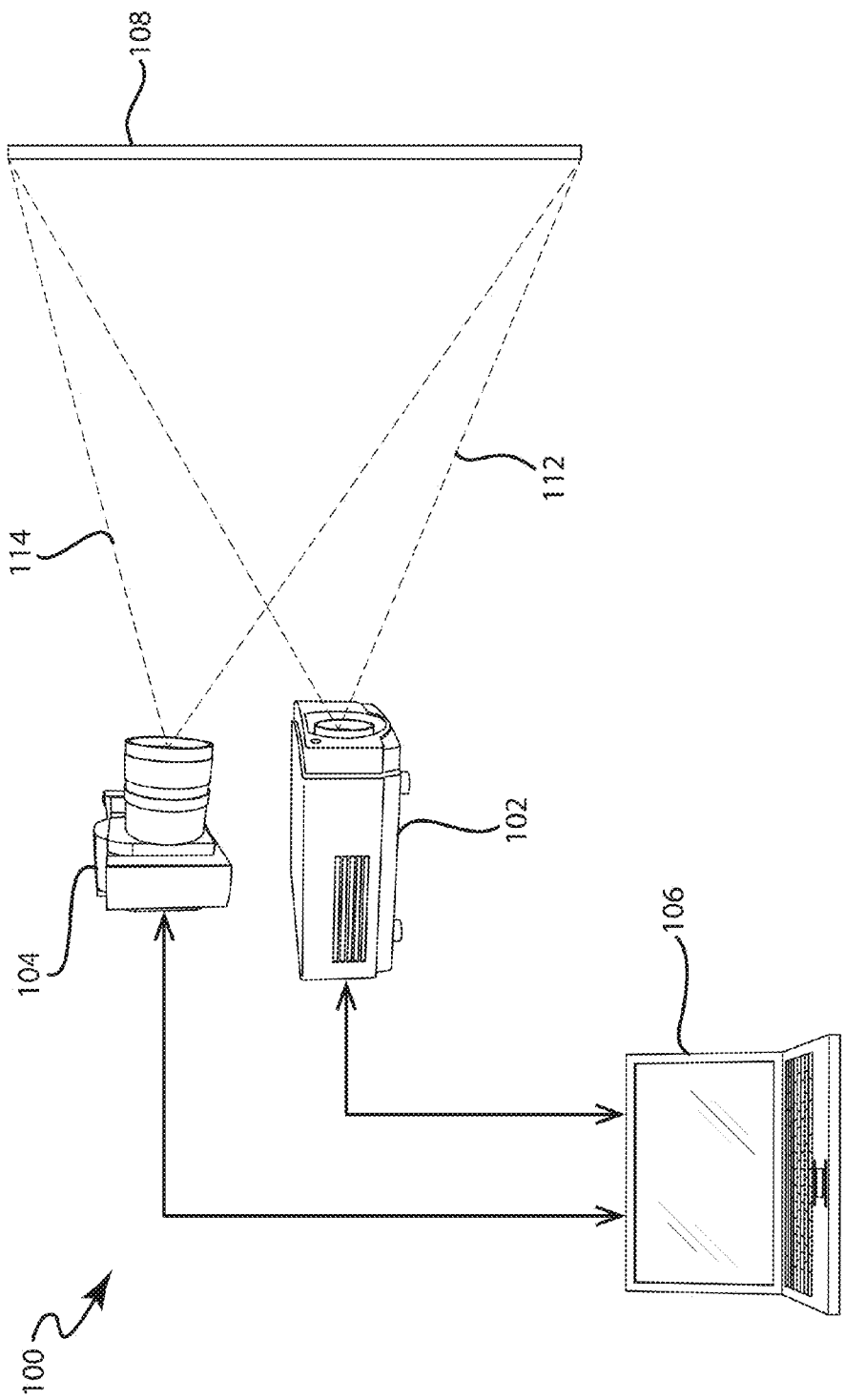
FIG. 1 is a perspective view of a system for photometrically calibrating a projector.

The present disclosure is related to a system for creating compensation images for projection by a projector onto a surface. The photometric compensated projector substantially neutralizes the projection surface onto which the images are projected. For example, the compensated images reduce the appearance of a non-perfectly white and/or textured surface such that the projected images and the images reflected or transmitted from the projection surface more accurately correspond to the desired output of an image input. The methods and systems are described herein primarily with reference to a front projection type system with a reflective projection surface. However, the systems, methods, and devices described herein are readily translated to a rear projection system where the projection surface is transmissive or diffusive rather than reflective.

In one embodiment, the system includes a projector, a camera, and a computer. Each of the elements of the system may be in communication with each other, either directly or indirectly. Using the system to create compensation images allows images projected by the projector to be varied in order to accommodate variations or discontinuities on a projection surface, e.g., wall, surface, or the like. As one method, the projector projects one or more calibration images onto the projection surface. The calibration images typically include structured light patterns that include known values of colors and geometric shapes. As the calibration images are projected, the camera captures one or more sample images. The sample images, or mapping images, captured the calibration images as they appear to the camera field of view (FOV) after projected onto the projection surface.

Once the sample images are captured, the images are provided to the computer which then evaluates the sample images and calibration images to create a compensate image. In particular, the computer generates a non-linear per-pixel map between the projector. The non-linear pixel mapping assumes that the projector and/or camera do not operate in the linear space, i.e., that the relationship between the input images projected by the projector and the sample images captured by the camera are not related to each other in a linear manner. Some reasons for the non-linear relationship as provided in this disclosure is that many projectors include different color channels within the projector that may contribute light to other channels within the projector (e.g., a purely blue pixel may include a small amount of green light from the green color channel), the input light intensity can be non-linear, projector color processing (e.g., white boost, brilliant color, and/or additional skin tone color), as well as characteristics of the hardware within the projector or camera can create a non-linear relationship between the two. Additionally, the camera that is used to capture the projected images may have a non-linear response. By using the non-linear color mapping, a compensation image can be determined by the computer.

The compensation image takes into account the desired output image based on the image input to the projector as well as the effects of the projector, camera, and projection surface. In this manner, the final compensation image, when projected onto the projection surface, will substantially match the input image (as captured by the camera), even in instances where the projection surface has color and/or topographical variations.

The compensation image is determined using a limited or sparse sampling of the projector's color gamut, which can be achieved in a relatively short period of time. After the samples have been acquired the data is processed using a scattered data interpolation to generate per-pixel mapping from the projector to the camera colors in real-time. Additionally, to reduce out-of-gamut artifacts, the input image is automatically scaled locally in an optional off-line optimization step maximizing the achievable luminance and contrast while still preserving the smooth input gradients without significant clipping errors.

Using embodiments of the system and method as described herein the projector may be quickly and easily calibrated to compensate for the projection surface and other characteristics as radiometric pre-calibration is not required. The projector calibration works for substantially every type of opaque and arbitrarily complex diffuse projection surfaces. As some examples, the projector calibration works for surfaces of various colors, topographies, or the like. This is because during the geometric calibration using structured light patterns, the mapping of the camera to the projector pixels can be carried out for each individual pixel, which means that the calibration can take into account the surface features (e.g., topography), as well as the colors. Further, the non-linearity does not require prerequisites with respect to the projector response. For example, the non-linear mapping works with devices that cannot be easily linearized due to non-linear white boost, multiple (e.g., 3 or more) color components, and so on. Additionally, the non-linearity works with most standard video projectors that include channel mixing image processing that is typically difficult to accurately linearize. The calibration method can be applied to a broad range of projectors and is able to be quickly adjusted as the input images change, the projection surface changes, and/or the projector characteristics or the projector itself changes. The method and system described herein are able to smooth interpolate between given sample points and adequately extrapolate colors, as well as compensate for non-monotonic responses and inter-channel color modulations.

DETAILED DESCRIPTION

Figure 2:
FIG. 2 is a front elevation view of an image being projected by the projector of FIG. 1 onto a projection surface.

Turning to the figures, the calibration system will be discussed in more detail. FIG. 1 is a perspective view of the calibration system. FIG. 2 is a front elevation view of a projected image on a projection surface. Referring to FIGS. 1 and 2, the system 100 includes a projector 102, a camera 104, and a computer 106. The projector 102 and camera 104 include FOVs 112, 114 that are directed towards a projection surface 108 allowing the projector 102 to project a projection image 110 onto the projection surface 108 and allowing the camera 104 to capture one or more images of the projection image 110 reflected from projection surface 108. The position of the projector 102 and the camera 104 can be varied as desired. For example, in many instances the camera 104 may be located from the position of a representative viewer (e.g., audience member). This allows the camera 104 to capture the projected images from the viewpoint of an audience member such that the compensation images may be adjusted for the point of view of the audience member. In other examples, the camera 104 may be aligned with the projector 102 such that the FOV 112, 114 of each device generally corresponds to each other. This configuration may be better suited for arbitrary viewing locations as the compensation of the projector 102 will be done from the FOV that corresponds to the projector lens. Accordingly, in instances where the location of a viewer may not be known or may change over time, the camera and the projector may have FOVS 112, 114 that are generally aligned with one another. The above examples are only two potential configurations of the camera and the projector and the position of the camera 104 and the projector 102 may be otherwise varied. Additionally, although only a single projector 102, camera 104 and computer 106 are illustrated, the system 100 may include substantially any number of each respective devices 102, 104, and 106 as desired. For example, the system 100 may include two or more cameras 104 in order to capture different images of the projected image 110, which may allow image variations due to characteristics of the camera to be more easily filtered out.

The projection surface 108 may be substantially any type of surface. In many instances the projection surface 108 may be a textured, off-white, colored, or other non-ideal reflective projection surfaces. For example, the projection surface 108 may be substantially any planar or arbitrarily shaped surface with sufficient diffuse reflectance to form an image in a given environment. It should be noted that the projection surface 108 may be white and may not include much, if any, spatially varying or arbitrary surface reflectance (i.e., be relatively smooth), but in these instances the images from the projector may not require a substantial amount of compensation. In other words, the methods and system disclosed herein has a larger effect in compensating projection images that are projected onto non-ideal surfaces. Additionally, the methods and system disclosed herein may be used for projectors that use rear projection. In these instances, the rear projection surface may be transmissive with sufficient diffusivity to allow an image to be formed.

Figure 3:
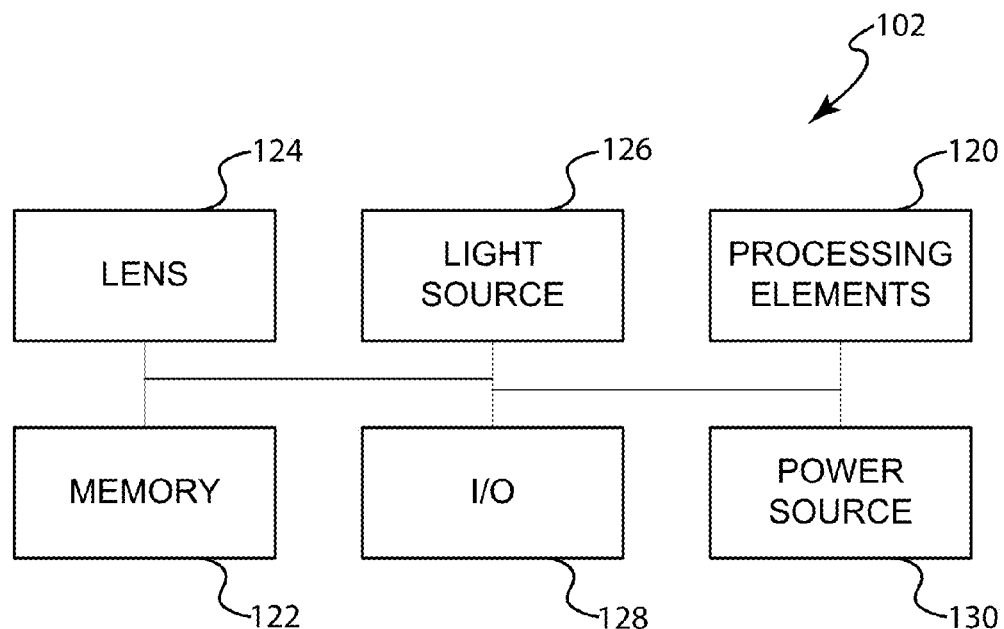
FIG. 3 is a simplified block diagram of the projector of FIG. 1.

The projector 102 can be any device configured to project and spatially control light. In some examples, the projector 102 may be a digital light processing (DLP) projector. FIG. 3 is a simplified block diagram of the projector 102. With reference to FIG. 3, the projector 102 may include one or more processing elements 120, one or more memory components 122, a lens 124, a light source 122, an input/output interface 126, and/or a power source 130. Each of the components of the projector 102 will be discussed in more detail below.

The processing element 120 can be substantially any electronic device capable of processing, receiving, and/or transmitting instructions. The memory 122 stores electronic data that is used by the projector 102. The input/output interface 128 provides communication to and from the projector 102, the camera 104, and/or computer 106, as well as other devices. The input/output interface 128 can include one or more input buttons, a communication interface, such as WiFi, Ethernet, or the like, as well as other communication components such as universal serial bus (USB) cables, or the like. The power source 130 may be a battery, power cord, or other element configured to transmit power to the components of the projectors.

The light source 126 is any type of light emitting element, such as, but not limited to, one or more light emitting diodes (LED), incandescent bulbs, halogen lights, lasers, or the like. The lens 124 is in optical communication with the light source and transmits light from the source 126 to a desired destination, in this case, the projection surface 108. The lens 124 varies one more parameters to affect the light, such as focusing the light at a particular distance. However, in some instances, such as when the projector is a laser projector, the lens may be omitted.

The projector 102 may also include a white balance adjustment or other color balance feature that can be adjusted automatically and/or manually. This allows the white point of the projector to be applied so as to avoid color shifts that are visible by a human observer.

The camera 104 is configured to capture images. The camera 104 typically includes a lens and an image sensor. The type of image sensor and lens are typically varied based on the camera. In many examples the camera 104 is configured to capture color images; however, in other embodiments the camera may be monochromatic and one or more color filers can be used over the camera's lens to capture color images. It is desirable for the image sensor of the camera 104 to be able to capture the entire dynamic range of the projector 102 without severe clipping.

Figure 4:
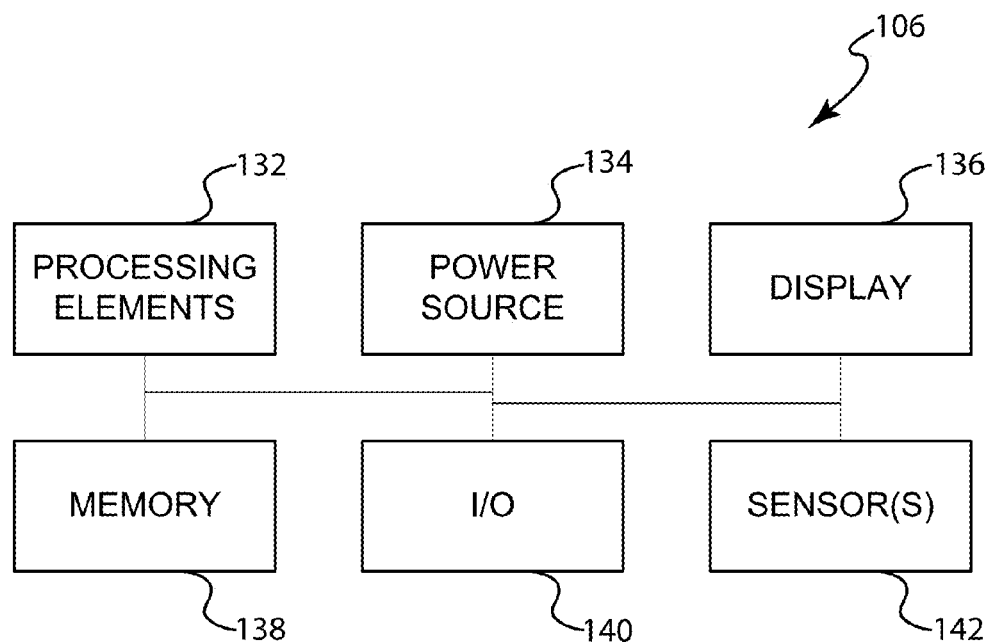
FIG. 4 is a simplified block diagram of a computer of FIG. 1.

Projector 102 and the camera 104 are in communication with one or more computers 106. In the example shown in FIG. 1 only one computer 106 is shown, but it should be noted that two or more computers may also be used. FIG. 4 is a simplified block diagram of the computer 106. With reference to FIG. 4, the computer 106 may include one or more processing elements 132 that are capable of processing, receiving, and/or transmitting instructions. For example, the processing elements 132 may be a microprocessor or microcontroller. Additionally, it should be noted that select components of the computer 106 may be controlled by a first processor and other components may be controlled by a second processor, where the first and second processors may or may not be in communication with each other.

The computer 106 may also include memory 138, such as one or more components that store electronic data utilized by the computer 106. The memory 138 may store electrical data or content, such as, but not limited to, audio files, video files, document files, and so on, corresponding to various applications. The memory 138 may be, for example, magneto-optical storage, read only memory, random access memory, erasable programmable memory, flash memory, or a combination of one or more types of memory components. In some embodiments, the memory component may be required to store 254*3 floating point values for each pixel, which depending on the resolution of the projector may require several gigabytes of memory. Accordingly, in some instances, the memory component 138 may be sufficiently large to handle this type of data storage, but can be adjusted based on the resolution of the projector and/or camera or based on other factors.

Computer 106 includes a power source 134 that provides power to the computing elements and an input/output interface 140. The input/output interface 140 provides a communication mechanism for the computer 106 to other devices, such as the cameras and/or projectors, as well as other components. For example, the input/output interface may include wired, wireless, or other network or communication elements.

Optionally, the computer 106 can include or be in communication with a display 136 and have one or more sensors 142. The display 136 provides a visual output for the computer 106 and may also be used as a user input element (e.g., touch sensitive display). The sensors 142 include substantially any device capable of sensing a change in a characteristic or parameter and producing an electrical signal. The sensors 142 may be used in conjunction with the cameras, in place of (e.g., image sensors connected to the computer), or may be used to sense other parameters such as ambient lighting surrounding the projection surface 108. The sensors 142 and display 136 of the computer 112 can be varied as desired to meet the needs of a particular application.

The system 100, using the computer 106, evaluates images projected by the projector 102 and captured by the camera 104 to create compensation images that factor out characteristics of the projection surface 108 that interfere with the desired output of the image. As will be discussed in more detail below with respect to FIG. 6, one or more calibration images are created by the computer 106 and/or projector 102 and projected onto the projection surface 108. The calibration images are used to calibrate the projector 102 to accommodate characteristics of the projection surface 108.

Figure 5A:
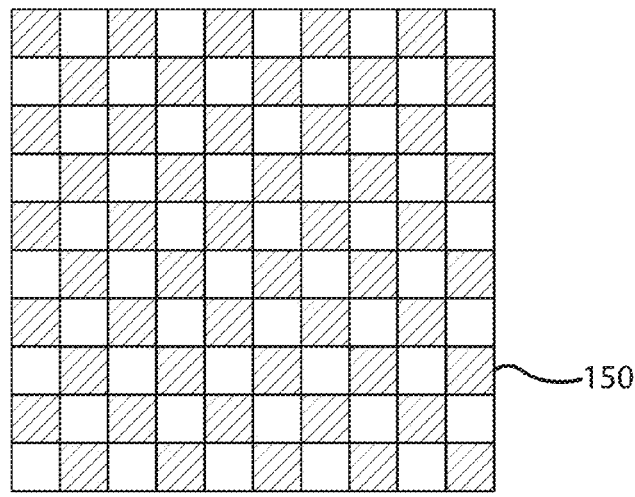
FIG. 5A is a front elevation view of a first example of a structured light pattern projected onto the projection surface.
Figure 5B:
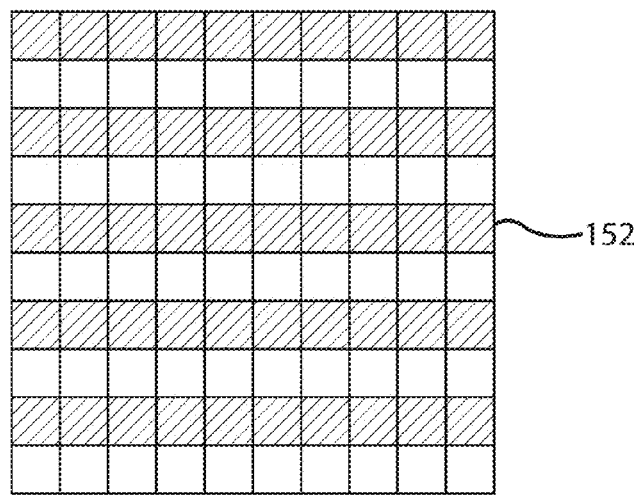
FIG. 5B is a front elevation view of another example of a structured light pattern projected onto the projection surface.

FIGS. 5A and 5B illustrate examples of calibration images. With reference to FIG. 5A, a first calibration image 150 may include a first pattern and with reference to FIG. 5B a second calibration image 152 may include a second pattern. The two patterns of the calibration images 150, 152 may be created by varying the colors, intensities, hues, shapes, or the like. For example, the first calibration image 150 includes a horizontal stripe pattern while the second calibration image 152 includes a checkerboard pattern. In these two examples, the patterns are created by altering colors in a pattern, however many other types of patterns may be used. In particular, the two calibration images 150, 152 may be substantially any type of structured light that can be used to estimate the color transformation between an image input to the projector and a captured image of the input image being projected onto the projection surface 108. The number of calibration images and the types of patterns can be varied as desired, also although described as patterns, the calibration images may be substantially any known projection of colors and can be a single non-varying color or include patterns that may not be recognizable to humans.

In some embodiments, the calibration images 150, 152 are selected to sample to the extrema as well as the interior of the full RGB color cube of the projector 102 evenly. This will allow the color space of the projector 102 to be sampled in a way that will allow the parameters of the projector 102 to be better evaluated. As one example, the calibration images 150, 152 are generated having colors with n increasing intensity levels from 0 to 255 in all three color channels, as well as the combinations of each color channel, leading to $n^3$ color samples. Additionally, if the projector 102 response curve is known or can be estimated, even roughly, the calibration images 150, 152 can be adjusted based on the response curve. This will allow the calibration images 150, 152 to be selected based on the output characteristics of the projector 102.

Figure 6:
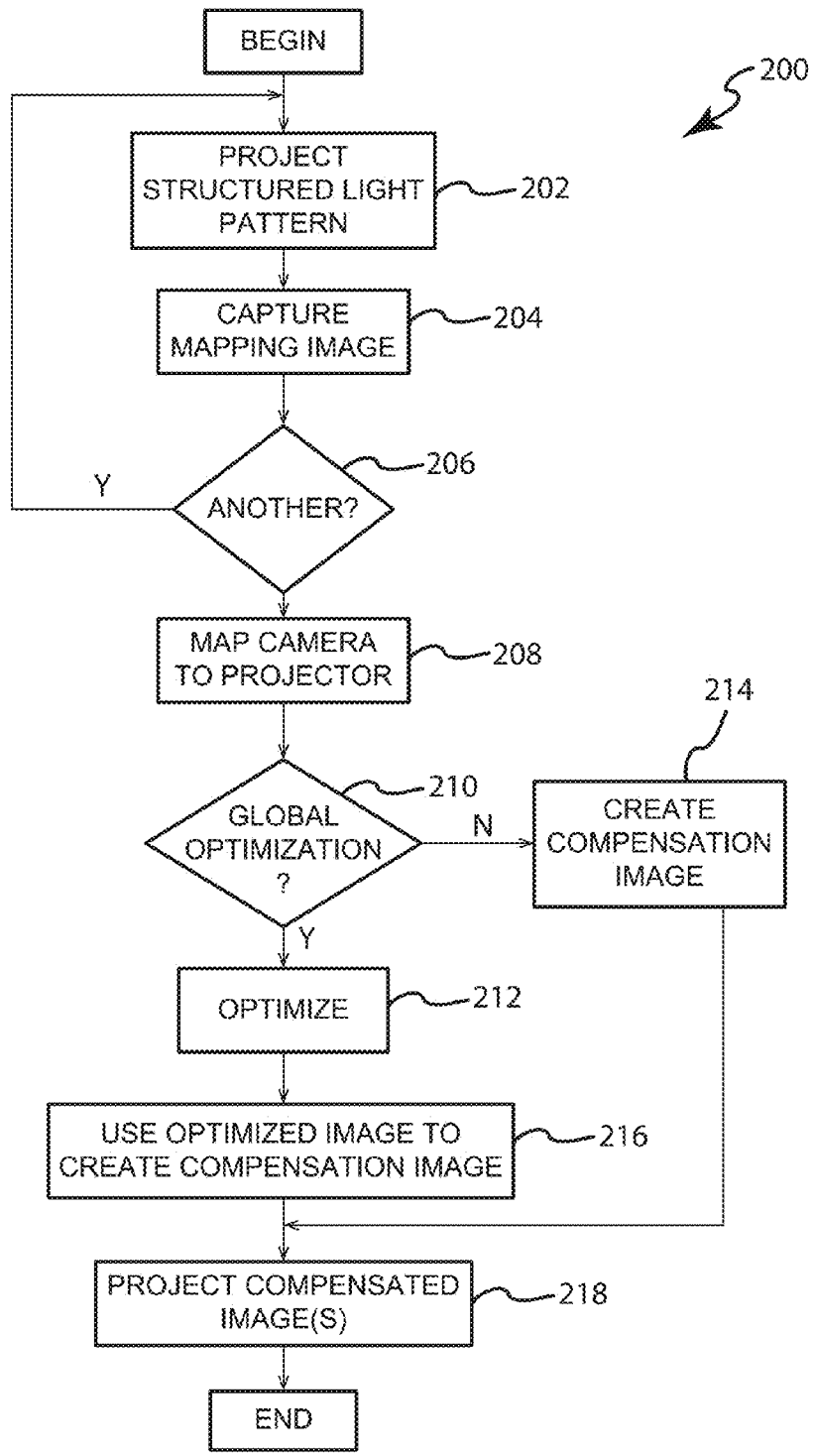
FIG. 6 is a flow chart illustrating a method for calibrating a projector using the system of FIG. 1.

A method for using the system 100 and calibration images 150, 152 to photometrically compensate the projector 104 will now be discussed in further detail. FIG. 6 is a flow chart illustrating a method for projector compensation. With reference to FIG. 6, the method 200 may begin with operation 202. In operation 202 the projector 102 projects a first structured light pattern onto the projection surface 108. For example, the first calibration image 150 is provided as an input to the projector 102 and then projected by the light source 126 and lens 124 onto the projection surface 108.

As the calibration image 150 is being projected onto the surface 108, the method 200 proceeds to operation 204. In operation 204 the camera 104 captures a mapping image. The mapping image represents the light as viewed by the camera 104 of the calibration image 150 projected onto the projection surface 108. In some embodiments, the mapping images may be stored as JPEG images (e.g., file extension .jpg). By using JPEG images, the calibration can be computed more quickly than with RAW images, transmission between the camera and the computer may be reduced, and the images may use less storage space as the data for JPEG images may be smaller. However, in other instances, the mapping images may be stored as RAW images that may not be processed. By using RAW images, the calibration may be more accurate, but require a longer processing time and increased storage as the RAW images offer higher bit depth and thus a larger dynamic range, as well as reduce the changes of lossy compression. The method 200 of FIG. 6 does not require RAW images, as it does not require that the mapping images be linearized (e.g., that the value at every pixel be directly related to the number of photons received at that location on the image sensor of the camera 104). Because this method 200 does not require RAW images, the mapping images may be easier to work with as typically RAW images may be specific to a particular camera 104 (e.g., based on the camera manufacturer). In short, the method 200 may utilize substantially any type of image file, which may be varied as desired.

After operation 204, the method 200 may proceed to operation 206. In operation 206, a user and/or the computer 106 determine whether another mapping image is needed. For example, in some embodiments, a less accurate or sensitive calibration may be required and as such fewer mapping images may need to be captured. However, in many instances a number of mapping images are desirable as each additional image increases the sensitivity of the calibration. In some embodiments, 100-400 mapping images may be captured. For example, in one embodiment n=4 or n=5. The number of mapping images may directly correspond to the number of calibration images used (i.e., for every mapping image collected a different structured light pattern is used). Alternatively, the number of mapping images may exceed the number of calibration images used (i.e., multiple mapping images may be captured using the same calibration image). The number of mapping images and calibration images may be varied based on the desired sensitivity and/or accuracy of the compensation for the projector, as well as the projection surface features, the characteristics of the camera, projector, and/or projected images.

If in operation 206 another mapping image is desired, the method 200 returns to operation 202 and a structured light pattern, such as the second calibration image 152 is projected by the projector. However, if in operation 206 another mapping image is not desired, the method 200 proceeds to operation 208.

In operation 208, the computer 106 uses the mapping images to map the camera 104 to the projector 102. In operation 208 arbitrary input images are transformed from the color space of the camera 104 to the color space of the projector 102 as the computer 106 determines the color transformation during the mapping process.

Figure 7:
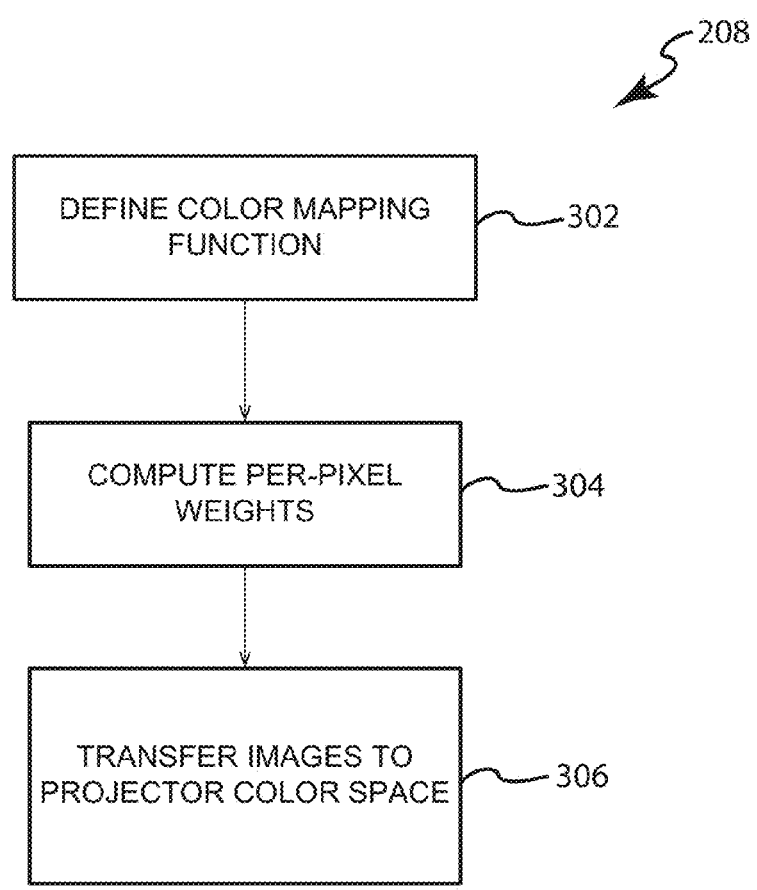
FIG. 7 is a flow chart illustrating a mapping operation of the method of FIG. 6.

FIG. 7 is a flow chart illustrating a per-pixel color mapping method that is performed during operation 206 in method 200. It should be noted that although the flow chart of FIG. 7 illustrates a per-pixel color mapping, the mapping may be done with groups of pixels or averages of pixels, i.e., not per-pixel. Using pixel groups of mapping allows the method to be performed faster, but with a reduced sensitivity. Depending on the desired application of the projector images, such as the features of the projection surface, the faster calibration may be preferred. For example, in instances where the projection surface is a single non-white color, the color mapping may be done for all of the pixels at the same time, as each pixel may be affected in similar manner. However, in instances where the projection surface may include multiple colors or variations in topography, the per-pixel mapping as shown in FIG. 7 provides for the most accurate calibration.

With reference to FIG. 7, the color mapping method 206 may begin with operation 302. In operation 302 the color mapping function is defined. The color-mapping function assumes a non-linear color relationship between the input colors (e.g., desired projection image colors input to the projector) and the compensation colors. The input colors correspond to the colors of a desired projected image as they are input to the projector. The compensation colors correspond to the colors that are required to generate the desired input colors on an image plane of the camera 104.

The color mapping function is defined by Eq. 1 below:

$$c_c^* = f(c_{in}^*) \qquad \text{Eq. 1}$$

With reference to Eq. 1, this color mapping function transforms the input colors $c_{in}^*$ into the compensation colors $c_c^*$ that are required to generate the desired intensities of the input colors on the image plane of the camera. In Eq. 1 the asterisk (*) denotes that the particular variable, e.g., input colors and compensation colors, are evaluated for three color channels, e.g., red, green, blue. The processing element 132 of the computer 106 may use a thin plate spline (TPS) interpolation to define the function of in Eq. 1. Thin plane spline interpolation is used to smoothly interpolate scattered data in three dimensions. The TPS method may use all samples (for example, the projected colors and the corresponding captured camera colors) to describe an accurate and smooth mapping of the input colors to the captured ones and to others that were not captured as part of the samples. Although the interpolation described herein is a TPS, other interpolation methods may be used. For example, a local spline interpolation may be used or other types of non-linear interpolation methods. The mapping images captured by the camera 104 in operation 204 sample the color space of the projector, as briefly explained above, the calibration images and mapping images may be sampled in a regular manner, as discussed above in one embodiment n=4 or n=5 calibration images 150, 152 are projected and subsequently captured by the camera 104 to produce n=4 or n=5 mapping images. It should be noted that the number and separation of the calibration images and mapping images may be otherwise varied as desired.

With reference to FIG. 7, using the mapping function of Eq. 1 and the mapping images captured in operation 204, the mapping operation 208 proceeds to operation 304. In operation 304, the processing element 132 of the computer 106 determines the weights for each per-pixel interpolation function as expressed below in Eq. 2. In particular, the input colors that are provided to the projector 102 to create the calibration images 150, 152 and the corresponding mapping images captured by the camera 104 of the calibration images 150, 152 as projected as analyzed by the processing element 132.

$$f(c_{in}^*) = \sum_{i=1}^{N} \omega_i^* \varphi(\|c_{in}^* - c_i^*\|) + \omega_{N+1}^* + \sum_{i=N+2}^{N+4} \omega_i^* \cdot \begin{cases} c_{in}^r, i = N+2 \\ c_{in}^g, i = N+3 \\ c_{in}^b, i = N+4 \end{cases} \qquad \text{Eq. 2}$$

In equations listed above in Eq. 2, $c_{in}^*$ is the input color sample as captured by the camera, N is the number of mapping images captured (e.g., the number of captured color samples of the projector 102), $\omega_i^*$ is a series of N+4 weight coefficients per color channel, $\|\cdot\|$ is the distance in the Euclidean space, $c_i^*$ is the captured reference color samples as projected (the individual colors used to create the calibration images, e.g., the $n^3$ color samples that are projected during calibration), and $\phi$ is selected as the TPS radial basis function (RBF) using Eq. 3 below.

$$\varphi(d) = \begin{cases} 0, d = 0 \\ d^2 \log d, \text{otherwise} \end{cases} \qquad \text{Eq. 3}$$

Eq. 3 minimizes the integral of the squared second derivative of $f(c_{in}^*)$ and therefore generates a smooth color mapping for the projector 102. In Eq. 3, d is the Euclidean distance of the normalized sample color $c_{in}^*$ to the normalized reference colors $c_i^*$. The computation of $\omega_i^*$ by the computer 106 often may be carried out once per projector-camera setup. In other words, $\omega_i^*$ does not need to be calculated unless there is a change in one or more parameters of the projector 102 and/or camera 104 (e.g., new camera or projector, new lens on the projector, etc.). The equations used to determine $\omega_i^*$ are provided below using Eq. 4. In particular, the weights calculated by inverting the linear equation system provided in Eq. 4. In Eq. 4, P is the color samples of the input image and $P^T$ is P transposed, K is the N×N matric which stores Eq. 3 for all color samples.

$$\begin{bmatrix} K & P \\ P^T & O(4,4) \end{bmatrix} \qquad \text{Eq. 4}$$

In Eq. 4, the elements are defined by equations listed in Eq. 5 below.

$$K_{(i,j)} = \varphi(d(c_i^*, c_j^*)); \qquad \text{Eq. 5}$$
$$i, j \in [0 \ldots N-1]$$

$$P = \begin{bmatrix} 1 & c_0^R & c_0^G & c_0^B \\ 1 & c_1^R & c_1^G & c_1^B \\ \cdots & \cdots & \cdots & \cdots \\ 1 & c_{N-1}^R & c_{N-1}^G & c_{N-1}^B \end{bmatrix}$$

$$O(x, y) = \begin{bmatrix} 0 & \cdots & 0 \\ \cdots & \cdots & \cdots \\ 0 & \cdots & 0 \end{bmatrix}$$

Using Eq. 5 and then multiplying the result with the reference color values as demonstrated by Eqs. 6 and 7 below, where $r^*\_i$ is the i-th input image, i.e., the projected color image.

$$[w^*] = \begin{bmatrix} K & P \\ P^T & O(4,4) \end{bmatrix}^{-1} \begin{bmatrix} Y \\ O(4,3) \end{bmatrix} \qquad \text{Eq. 6}$$

$$Y = \begin{bmatrix} r_0^R & r_0^G & r_0^B \\ r_1^R & r_1^G & r_1^B \\ \cdots & \cdots & \cdots \\ r_{N-1}^R & r_{N-1}^G & r_{N-1}^B \end{bmatrix} \qquad \text{Eq. 7}$$

In some examples, to reduce the influence of outliers in the capturing of the mapping images of the calibration images, such as due to noise and/or sampling, a small regularization term can be added by the processor to the thin plate spline weights computation. This is applied by adjusting the definition of matrix K to:

$$K_{(i,j)} = \varphi(d(c_i^*, c_j^*)) + I_{(i,j)}\alpha^2\lambda; i,j \in [0 \ldots N-1] \qquad \text{Eq. 8}$$

In Eq. 8 the relationship demonstrated by Eq. 9 is used.

$$\alpha = \frac{\sum_{i=0}^{N-1}\sum_{j=0}^{N-1} d(c_i^*, c_j^*)}{N^2} \quad \text{Eq. 9}$$

During computation, Eq. 3 is evaluated once for each surface point to determine the projector pixel intensities for the compensated image.

With continued reference to FIG. 7, once the weighting factors for determined for each pixel, the mapping operation 208 proceeds to operation 306. In operation 306, input images are transferred from the color space of the camera 104 to the color space of the projector 102 by using Eq. 2 to determine the transformation. After operation 306, the mapping operation 208 is complete and the with reference to FIG. 6, the method 200 proceeds to operation 210.

In operation 210, the user and/or the computer 106 determine whether the compensation images should be globally optimized. For example, the color values for the compensation image as calculated using Eq. 2 may be affected by a number of errors, such as those due to out-of-gamut clipping that can arise from RGB values that are too bright or are too low and that cannot be reproduced on dark or colorful surface pigments on the projection surface 108 or based on ambient illumination of the projection surface 108.

If optimization is not desired, the method 200 proceeds to operation 214. In operation 214 the compensation image is determined using Eq. 2. The compensation image being the image that results in the projection of the input image on the projection surface 108 matching the color, intensity, and luminance values of the input image as it is input to the projector 102.

If optimization is desired, the method 200 proceeds to operation 212. In operation 212, to avoid the clipping and other errors, the input image provided to the projector 102 can be globally adjusted by adapting the overall brightness and saturation such that the color values required for the compensation still can be generated by the projector 102. An adaptive, spatially varying adjustment to the input image may increase the overall perceived image quality, especially in instances where the projection surface 108 contains high spatially reflectance variations.

Typically, there are two main factors that influence regional clipping errors, the local reflection properties of the projection surface 108 and the intensities of the image content. The local reflections on the projection surface 108 are static. The intensities of the image content can be reduced by optimizing the input colors and slightly changing the content. In some embodiments, the luminance of the input colors is smoothly adapted by a spatially varying scalar p to avoid clipping. To achieve this, a non-linear optimization is applied to the input image to minimize the sum of the following per pixel errors: saturation error, intensity error, and gradient variation errors. Each of these errors and the error equations that are used by the computer 106 are provided below.

Saturation error typically occurs due to limited maximum projector brightness and generates perceived artifacts as expressed below in Eq. 10.

$$err_{sat}(x, y) = \begin{cases} (c_c^*(x, y) - 1.0)^2, & c_c^*(x, y) > 1.0 \\ 0, & \text{else} \end{cases} \quad \text{Eq. 10}$$

Intensity error typically results from an intensity reduction at the current pixel and reduces the image brightness, with Eq. 11 an increase in intensity is accepted.

$$err_{int}(x, y) = \begin{cases} (1.0 - p(x, y))^2, & p(x, y) < 1.0 \\ 0, & \text{else} \end{cases} \quad \text{Eq. 11}$$

Gradient variation error typically results from the spatially varying intensity adjustments leading to potentially visible local intensity variations as expressed by Eq. 12 below.

$$err_{grad}(x,y) = (p(x,y)-p(x-1,y))^2 + (p(x,y)-p(x+1,y))^2 + (p(x,y)-p(x,y-1))^2 + (p(x,y)-p(x,y+1))^2(6) \quad \text{Eq. 12}$$

Independent weights are applied to the error equations Eqs. 10, 11, and 12 to generate an acceptable tradeoff between the image degradation from clipping errors, as well as global and smooth local luminance reduction in the final error term expressed as Eq. 13 below.

$$err = \sum_{x=0}^{width-1} \sum_{y=0}^{height-1} \omega_{sat} \cdot err_{sat}(x, y) + \omega_{grad} \cdot err_{grad}(x, y) + \omega_{int} \cdot err_{int}(x, y) \quad \text{Eq. 13}$$

As one example, error weights of $\omega_{sat}=200$. $\omega_{grad}=1$, and $\omega_{int}=50$ for the error weights in Eq. 13. However, it should be noted that the above weights are specific to one system 100 and are envisioned to be changed based on variations in the input image, projector, camera and/or projection surface.

In some embodiments it may be desirable to increase the speed of the optimization process. In one example, the optimization may be applied to a sub-sampled input image such that only the darkest value in each image rectangular defining one pixel in the low-resolution representation is stored for the compensation data calculation, while only the brightest value is stored for the input image. This helps to ensure that the worst case scenario in terms of error is considered during the optimization operation 212. As one example of the sub-sampling, 40×30 pixels are used which balances the tradeoff between accuracy as well as computation time for the computer 106. However, the sub-sampling may be adjusted depending on the spatial frequency of the projection surface 108 texture. To solve this relatively large number of variables without undue delay, the computer 106 may apply a bound constrained optimization that does not require derivatives (BOBYQA).

After operation 212, the method 200 proceeds to operation 216 and the optimized image is used to create a compensation image. In particular, the resulting image is smoothly up-sampled into its originally resolution an dudes to adjust the luminance of the image used as the input for Eq. 2 to create the compensation image.

After either operation 214 or operation 216, the method 200 proceeds to operation 218. In operation 218, the projector 102 projects the compensated input image onto the projection surface 108. As briefly mentioned above, the compensated image, when projected onto the projection surface 108 substantially matches the input image as provided to the projector 102, e.g., from the computer 106 or other source. The compensation image varies the image characteristics of the input image such as, but not limited to, color (e.g., hue), intensity, luminance, to compensate for the projector's 102 characteristics (e.g., color channel mixing, light sources, etc.) and the characteristics of the projection surface 108 (e.g., color, texture, material, and/or ambient lighting). This allows the projected image 110 to substantially match the desired values of the input image, despite the background onto which it is projected and the inherent properties of the projector 102.

Conventional compensation methods use a linear relationship to map between the projector and the camera. However, these linear methods are not able to describe a projector's complex response curve accurately, such as the response curve for a DLP projector with advanced image processing. The method 200 and system 100 presented herein use a non-linear estimation to more closely reproduce the desired color without requiring the time consuming and exhaustive calibration techniques. That is, the method 200 and system 100 allow for the high photometric compensation without the need for any radiometric device pre-calibration. By projecting and capturing a reasonable number of calibration and mapping images, a non-linear color mapping can be generated by the computer 106 enabling an accurate compensation projection image, even on strongly textured surfaces.

Using the method 200 and system 100, the quality of the compensation image is not influenced by linearization errors that result from inaccurate or noisy radiometric calibration, as radiometric calibration is not required. Additionally, the computer 106 processing the equations for the color mapping can compensate for the complex and multi-primary processing of many single-chip DLP projectors. In other words, the internal processing for the projector is not required to be known, but the effects of the processing, which is included in many projectors, can be taken into account in the compensation image. Further, because no radiometric calibration is required, the system 100 does not required specialized hardware, which makes the calibration more easily implemented than conventional systems.

It should be noted that in some embodiments, a dense sampling may be done to populate a look-up table. In this embodiment, a significant amount of images are captured and stored, but then during real-time operation the compensation image may be determined by using the look-up table rather than computing it in real time. This embodiment may require a significant amount of memory and therefore depending on the application may not be desirable.

Figure 8A:
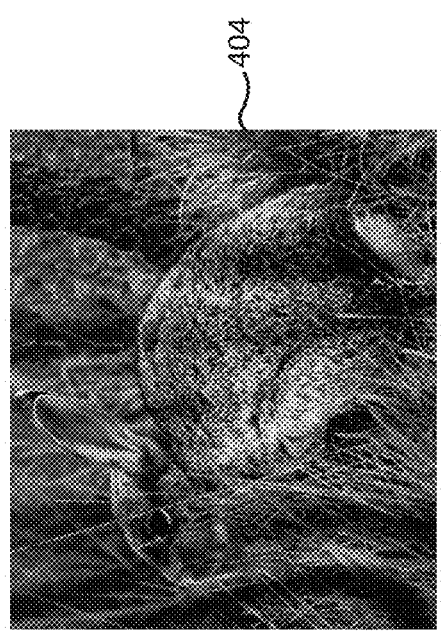
FIG. 8A is a first example of an input image to be projected by the projector.
Figure 8B:
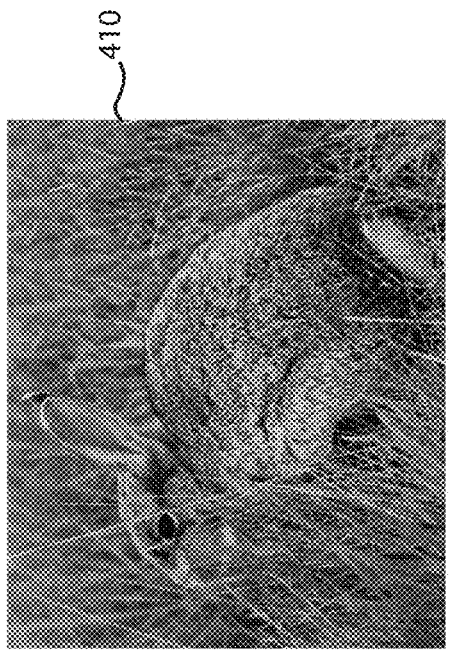
FIG. 8B is a photograph of the input image projected onto a non-uniform projection surface.
Figure 9A:
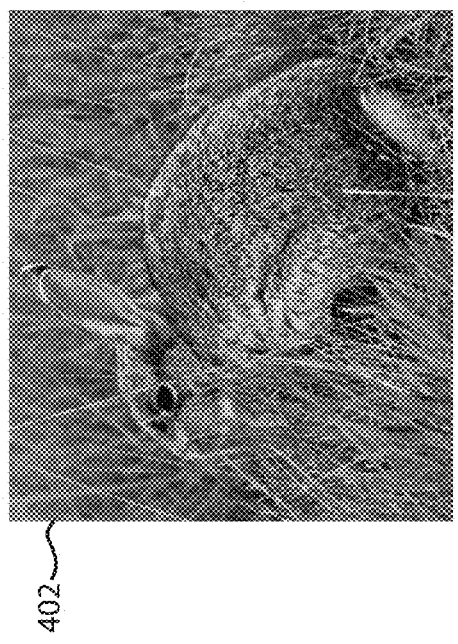
FIG. 9A is a photograph of a compensation image projected onto the non-uniform projection surface.
Figure 9B:
FIG. 9B is a photograph of an optimized compensated image corresponding to the input image of FIG. 9A projected onto the non-uniform projection surface.
Figure 10:
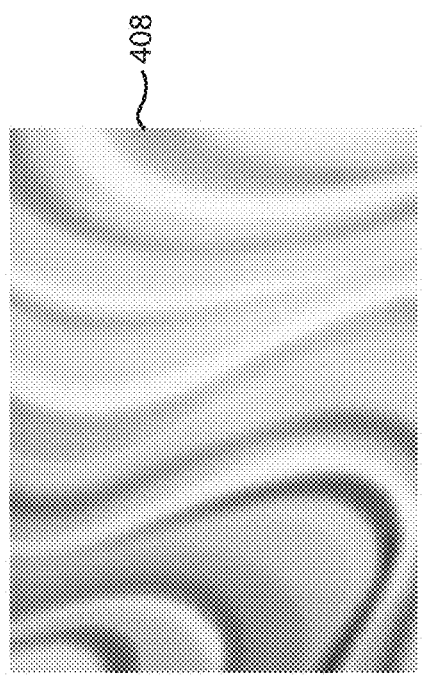
FIG. 10 is a photograph of the non-uniform projection surface onto which the images of FIGS. 8A-9B are projected.
Figure 11B:
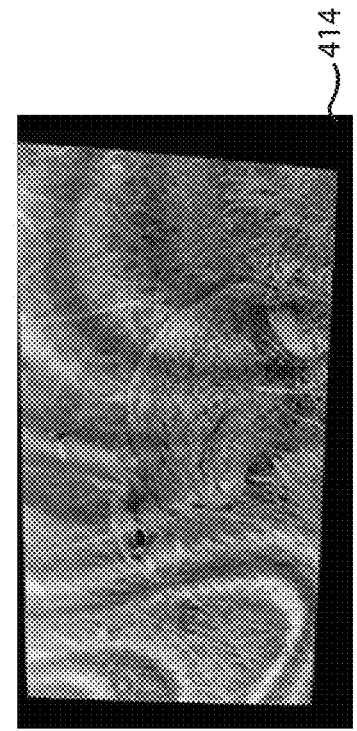
FIG. 11B is an optimized compensated image used in FIG. 9B prior to being projected onto the projection surface of FIG. 10.
Figure 11A:
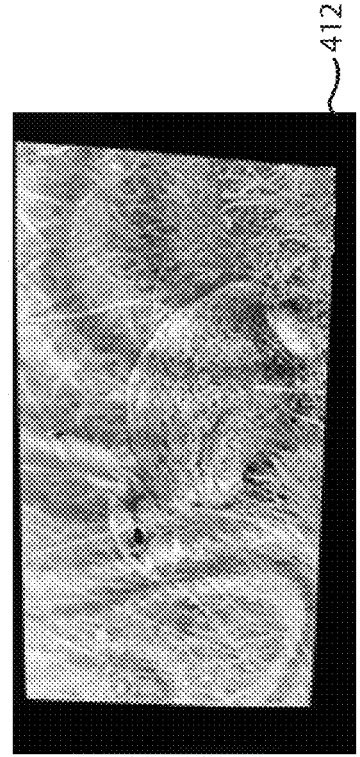
FIG. 11A is a compensated image used in FIG. 9A prior to being projected onto the projection surface of FIG. 10.

Examples of original input images projected onto the projection surface without compensation and then the compensated images projected onto the same surface will now be discussed. FIGS. 8A-10 illustrate an example of the system 100 and method 200 to calibrate a projector. FIG. 8A is an illustrative input image. FIG. 8B is an illustrative example of the input image, prior to compensation, projected onto a projection surface. FIG. 9A is an illustrative image of a compensated image projected onto the projection surface. FIG. 9B is an illustrative image of an optimized compensated image projected onto the projection surface. FIG. 10 is the projection surface used to capture the images of FIGS. 8A-9B. FIG. 11A is a compensation image used for FIG. 9A. FIG. 11B is an optimized compensation image used for FIG. 9B.

In the examples of FIGS. 8A-11B the projector 102 was a liquid crystal display (LCD), single-chip DLP projector with activated brilliant color processing and a manually adjusted white point. The camera 104 in this example was a CANON digital lens single reflex (DSLR). The mapping images were JPEG format. Noise from the camera 104 and due to color shifts from sequential DLP processing were minimized by averaging 8 images for each projection. The calibration images 150, 152 used were generated via a structured light scan based on gray codes with additional light shift patterns. The mapping equations were evaluated by the computer 106 using C++ and OPENMP based parallelization. For acceleration, the algorithms embodying the equations were written with a GLSL fragment program as well. This allowed fast processing to enable real-time results.

With reference to FIGS. 8A, 8B, and 10, the projection surface 408 in this example is a multi-colored surface, with the colors applied across the surface in a random pattern. As shown in FIG. 8B, when the input image 402 is projected onto the projection surface 408 there are a number of image artifacts shown in the projected image 404. In particular, the colors of the projection surface 408 are visible through the projected image 404. In other words, the input image 402 does not appear on the projection surface 408 with the same color values and luminance as desired due to the effect of the projection surface 408 on the image.

With reference to FIGS. 9A and 11A, a compensation image 412 (FIG. 11A) is projected onto the same projection surface 408 of FIG. 10, and FIG. 9A shows the projected compensated image 406. As shown in FIG. 9A as compared to FIG. 8B, the projected compensated image 406 substantially matches the input image 402, despite the projection surface 408 being multi-colored. This is because the compensated image 412 was modified to modulate the effects of the colors and/or topographies of the projection surface 408 to allow the projected compensated image 406 to more closely match the input image 402.

In some embodiments the compensated image 412 may be sufficient to modulate the effects of the projection surface 408, without requiring optimization. For example, depending on the colors, materials, and/or textures of the projection surface the compensated image without optimization may be sufficiently close to the input image that optimization may not be required. However, in some instances, optimization may further match the projected image to the input image. With reference to FIGS. 9B and 11B, an optimized compensated image 414 is projected onto the projection surface 408 and the projected optimized image 410 substantially matches the input image 402. In this example, the brightness of the input image 402 may be higher than the projected optimized image 410. This is because in the method 200, as described above with respect to FIG. 6, during optimization there may be a tradeoff between brightness and hue.

Figure 12A:
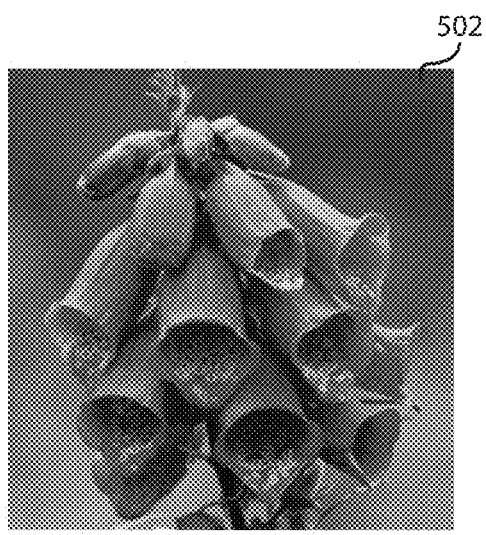
FIG. 12A is a second example of an input image to be projected by the projector.
Figure 12B:
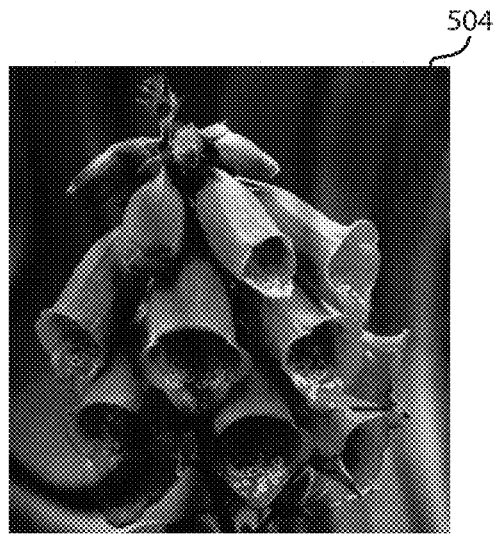
FIG. 12B is a photograph of the input image of FIG. 12A projected onto the projection surface of FIG. 10.
Figure 12C:
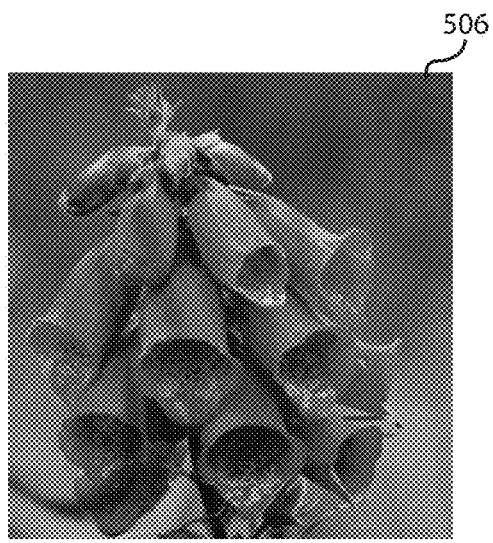
FIG. 12C is a photograph of a compensated image corresponding to the input image of FIG. 12A projected onto the projection surface of FIG. 10.
Figure 12D:
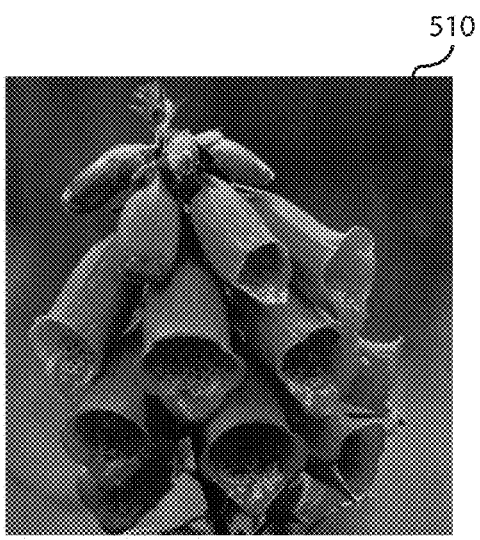
FIG. 12D is a photograph of an optimized compensated image corresponding to the input image of FIG. 12A projected onto the projection surface of FIG. 10.

As another example of the method 200, FIGS. 12A-12D illustrate various images that are projected onto the same projection surface 408 of FIG. 10. FIG. 12A illustrates the input image 502 that is projected onto the projection surface 408. FIG. 12B illustrates the projected input image 502, prior to compensation, illustrating various image artifacts due to the input image not having been modulated to account for the non-white surface of the projection surface 408. Turning to FIG. 12C, the projected compensated image 506 more closely matches the appearance of the input image 502 due to the colors of the projection surface 408 being modulated. However, the projected compensated image 506 includes some artifacts due to clipping errors. With reference to FIG. 12D, the projected optimized image 510 eliminates most of the artifacts shown in images 504 and 506. In this example, the projected optimized image 510 most closely represented the input image 502, despite being projected onto a non-white multi-colored projection surface 408.

Figure 13:
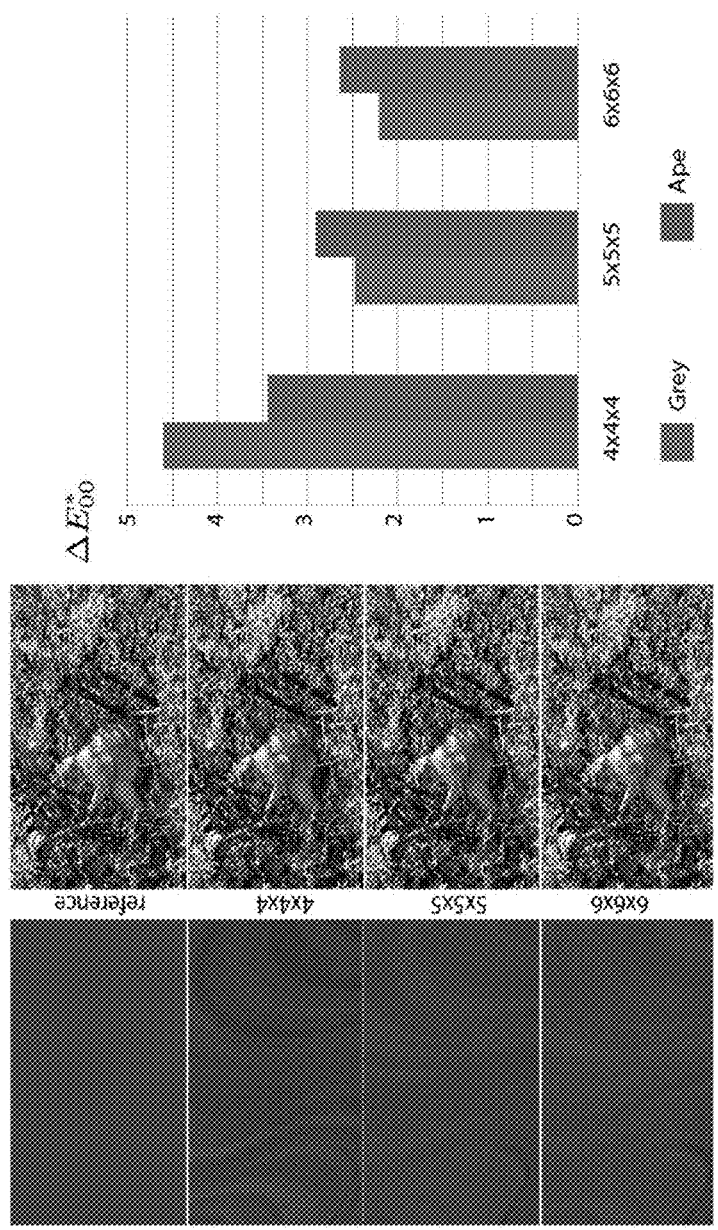
FIG. 13 is a diagram showing an example evaluation of the image quality of the compensated projection with respect to the number of sample patterns used

In some embodiments, a tradeoff between time and quality may be made to allow the method 200 to execute faster, while reducing some sensitivity. FIG. 13 illustrates an example of this tradeoff. With reference to FIG. 13, two sample image series are shown on the left and the graph illustrates the average $\Delta E_{00}$* of the two sample image series. As shown in the graph of FIG. 13, there is a large quality improvement between $4^3$ and $5^3$ samples, but the extension to $6^3$ samples only marginally improves the result, while requiring almost twice as many images. This illustrates that in some instances fewer samples may be desirable as they allow the method 200 to execute faster, while still offering an improved image.

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for calibrating a projector comprising:
receiving by a processing element one or more mapping images;
defining by the processing element a non-linear color mapping function, wherein the non-linear color mapping function maps between colors of the mapping images and a color space of the projector; and
determining by the processing element a compensation image using the color mapping function, wherein the compensation image corresponds to an input image and takes into account variations in a projection surface onto which the input image is to be projected.

2. The method of claim 1, further comprising:
projecting by the projector one or more calibration images onto a projection surface; and
capturing by a camera the one or more mapping images; wherein
the one or more mapping images are images of the calibration images on the projection surface.

3. The method of claim 1, wherein determining the compensation image comprises:
analyzing one or more input images and the one or more mapping images; and
computing a weight for each pixel using a per-pixel interpolation function.

4. The method of claim 1, further comprising optimizing the compensation image.

5. The method of claim 1, wherein the compensation image is adjusted on a per-pixel basis.

6. A The method for calibrating a projector comprising:
receiving by a processing element one or more mapping images;
defining by the processing element a non-linear color mapping function;
determining by the processing element a compensation image using the color mapping function, wherein the compensation image corresponds to an input image and takes into account variations in a surface onto which the input image is to be projected;
projecting by the projector the compensation image onto a projection surface, wherein
when projected onto the projection surface the compensation image substantially matches the input image.

7. The method of claim 6, wherein prior to projection onto the projection surface the compensation image does not substantially match the input image.

8. The method of claim 6, wherein the combination of the compensation image and at least one of the texture, color, or material of the projection surface operates to substantially match the input image.

9. The method of claim 6, wherein the projection surface is at least one of an opaque surface or arbitrarily complex.

10. A system for projector calibration comprising:
a camera;
a projector to project images onto a projection surface; and
a computer in communication with the camera and the projector, the computer comprising a processor configured to perform the following operations:
determine a compensation image to modulate an image reflected from the projection surface; and
provide the compensation image to the projector; wherein
the compensation image is determined using a non-linear mapping between one or more mapping image captured by the camera of a projected image and the projector, wherein the compensation image modules both the effects of a geometry and a color appearance of the projection surface on the image.

11. The system of claim 10, wherein the compensation image is determined without a radiometric calibration of the projector.

12. The system of claim 10, wherein the non-linear mapping is a color mapping function that transforms one or more input colors of an input image into one or more compensation colors to generate the desired intensities of the input colors on the projection surface.

13. The system of claim 10, wherein the processor is further configured to optimize the compensation image to minimize saturation errors.

14. The system of claim 10, wherein determining the compensation image comprises:
analyzing one or more input images and the one or more mapping images; and
computing a weight for each pixel using a per-pixel interpolation function.

15. A method for determining neutralizing colors for an image projected onto a surface comprising:
capturing by a camera at least one structured light pattern projected by a projector onto the surface;
mapping a plurality of projector pixels to a plurality of camera pixels in a non-linear manner; and
using the map to determine a neutralization image; wherein the neutralization image neutralizes the surface to substantially replicate an input image.

16. The method of claim 15, wherein the projector is not pre-calibrated using radiometric calibration.

17. The method of claim 15 wherein the mapping operation comprises computing a mapping function by a processor using thin plate splines.

* * * * *

UNITED STATES PATENT AND TRADEMARK OFFICE
CERTIFICATE OF CORRECTION

PATENT NO. : 9,325,956 B2
APPLICATION NO. : 14/180083
DATED : April 26, 2016
INVENTOR(S) : Anselm Grundhofer Page 1 of 1

It is certified that error appears in the above-identified patent and that said Letters Patent is hereby corrected as shown below:

In the claims,

In claim 6, at column 15, line 57, should read: "A method for calibrating a projector comprising:"

Signed and Sealed this
Second Day of August, 2016

Michelle K. Lee
*Director of the United States Patent and Trademark Office*